(12) United States Patent
Shrestha et al.

(10) Patent No.: US 12,742,877 B2
(45) Date of Patent: Sep. 22, 2026

(54) MAPPING OF SCATTERER LOCATIONS IN A RADIO ENVIRONMENT

(71) Applicant: Telefonaktiebolaget LM Ericsson (publ), Stockholm (SE)

(72) Inventors: Deep Shrestha, Linköping (SE); Gustav Lindmark, Linköping (SE); Sara Modarres Razavi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 18/285,056

(22) PCT Filed: Apr. 1, 2022

(86) PCT No.: PCT/EP2022/058797
§ 371 (c)(1),
(2) Date: Sep. 29, 2023

(87) PCT Pub. No.: WO2022/207926
PCT Pub. Date: Oct. 6, 2022

(65) Prior Publication Data

US 2024/0183974 A1 Jun. 6, 2024

Related U.S. Application Data

(60) Provisional application No. 63/169,548, filed on Apr. 1, 2021.

(51) Int. Cl.
*G01S 13/87* (2006.01)
*G01S 13/00* (2006.01)
(Continued)

(52) U.S. Cl.
CPC .......... *G01S 13/878* (2013.01); *G01S 13/003* (2013.01); *G01S 13/75* (2013.01); *G01S 2013/464* (2013.01)

(58) Field of Classification Search
CPC ...... G01S 13/003; G01S 13/75; G01S 13/878; G01S 2013/464; G01S 2205/00; G01S 1/00
See application file for complete search history.

(56) References Cited

U.S. PATENT DOCUMENTS

2021/0181332 A1* 6/2021 Yun .......................... G01S 7/025
2021/0223376 A1* 7/2021 Luo .......................... G01S 13/003
(Continued)

FOREIGN PATENT DOCUMENTS

CN 109923820 A 6/2019
CN 112034421 A 12/2020
(Continued)

OTHER PUBLICATIONS

Shukri, Shaufikah , et al., "Device-Free Localization for Human Activity Monitoring", IntechOpen, www.intechopen.com/books/intelligent-video-surveillance/device-free-localization-for-human-activity-monitoring, 2019, 1-26.
(Continued)

*Primary Examiner* — Timothy X Pham
(74) *Attorney, Agent, or Firm* — Murphy, Bilak & Homiller, PLLC

(57) ABSTRACT

Methods for determining a location of an object using radio measurement observations in a radio network. An example method comprises the step of obtaining (1610) information comprising (a) a first angle-of-arrival parameter and/or first angle-of-departure parameter corresponding to a non-primary propagation path of a radio signal transmitted between a first wireless device and a second wireless device, and further comprising either or both of (b) a delay measurement or time-of-arrival measurement for the non-primary propagation path: and (c) a second angle-of-arrival parameter and/or second angle-of-departure parameter corresponding to the non-primary propagation path, the second angle-of-
(Continued)

1610: OBTAIN MEASUREMENT/OBSERVATION INFORMATION CORRESPONDING TO SIGNAL TRANSMITTED BETWEEN FIRST AND SECOND WIRELESS DEVICES

1620: ESTIMATE LOCATION FOR SCATTERING OBJECT, BASED ON OBTAINED INFORMATION arrival parameter and second angle-of-departure parameter corresponding to a different end of the non-primary propagation path to the first angle-of-arrival parameter and angle-of-departure parameter. The method further comprises estimating (1620) a location for an object other than the first and second wireless devices, based on the obtained information.

12 Claims, 16 Drawing Sheets

(51) Int. Cl.
*G01S 13/46* (2006.01)
*G01S 13/75* (2006.01)

(56) References Cited

U.S. PATENT DOCUMENTS

2021/0385784 A1* 12/2021 Park ...................... H04W 24/10
2021/0389407 A1* 12/2021 Park ........................ G01S 5/011

FOREIGN PATENT DOCUMENTS

EP 3726896 A1 10/2020
WO 2016146182 A1 9/2016
WO 2017207042 A1 12/2017
WO 2019164370 A1 8/2019
WO 2020057748 A1 3/2020

OTHER PUBLICATIONS

Unknown, Author , "Considerations on other enhancements for positioning accuracy", Huawei, HiSilicon, 3GPP TSG RAN WGI Meeting #104-e, RI-2101252, E-meeting, Jan. 25-Feb. 5, 2021, 1-5.
Unknown, Author , "Enhancement for UL AoA positioning", Huawei, HiSilicon, 3GPP TSG RAN WGI Meeting #104-e, RI-2100237, E-meeting, Jan. 25-Feb. 5, 2021, 1-10.

* cited by examiner

MAPPING OF SCATTERER LOCATIONS IN A RADIO ENVIRONMENT

TECHNICAL FIELD

The present disclosure is generally related to wireless networks and is more particularly related to determining the locations of non-radio objects in a radio network environment.

BACKGROUND

The primary purpose of the various radio access technologies (RATs) designed and deployed over the past 40 years is provide seamless communication services to end consumers. Communication services have evolved over that time, and range today from provisioning a voice call setup between two end users to providing required connectivity to mobile broadband users. This includes, for instance, device-to-device communications and emerging vehicular use cases that use wireless radio signals.

As new use cases are emerging, RAT-based technologies have now adapted themselves to provide services beyond communication. An example of such a service is positioning. Positioning has been a key area of investigation by members of the 3$^{rd}$-Generation Partnership Project (3GPP) and others since Release 9 of the 3GPP specifications, which provided RAT-based positioning as a solution that can overcome limitations of satellite-based positioning systems, which are typically limited to visibility of multiple satellite stations for accurate User Equipment (UE) positioning. With the advent of New Radio-based positioning as specified in Release 17 of the 3GPP specifications for a 5G network commonly referred to as "NR" or "New Radio," RAT-based positioning methods are expected to support use cases that require positioning accuracy of around 20 cm (horizontal position estimation).

Positioning in 4G wireless networks, which comprise an LTE radio access network (RAN) and an Evolved Packet Core (EPC), as well as in 5G wireless networks comprising an NR RAN and a 5g core network (5GC or 5GCN), is supported by an architecture like the example positioning architecture shown in FIG. 1, and utilizes direct interactions between a UE 100 and a location server 130 via the LTE Positioning Protocol (LPP) 151. Moreover, there are also interactions between the location server 130 and the serving radio base station 110 via the LPPa protocol 152, to some extent supported by interactions between the radio base station 110 and the UE 100 via the Radio Resource Control RRC protocol 150. The radio base station 110 interacts with a mobility network entity 120 via a first interface protocol 153, and the mobility network entity 120 interacts with the location server 130 via a second interface protocol 154. In some applications, the location server interacts with a Global Navigation Satellite System (GNSS) correction data provider 140 via a third interface protocol 155.

In the 3GPP specifications for 4G and 5G, the nodes, functionalities, and interfaces described above have different names, as shown in the table below:

TABLE 1

| Generic name | Name in 4G/ LTE/EPC | Name in 5G/ NR/5GC |
|---|---|---|
| Location server (130) | Evolved Serving Mobile Location Center (E-SMLC) or SLP | Location Management Function (LMF) or SLP |
| Radio base station (110) | eNodeB | gNodeB |
| Mobility network entity (120) | Mobility Management Entity (MME) | Access and Mobility Management Function (AMF) |
| First interface (153) | S1-MME | N2 |
| Second interface (154) | SLs | NL1 |

In both systems, the location server can also interact directly with the UE over UserPlane communication carrying LPP (151) with signaling defined by Open Mobile Alliance (OMA) Secure UserPlane Location (SUPL) or some other UserPlane signaling. In case of SUPL, the location server is denoted SUPL Location Platform (SLP) and the device is denoted SUPL Enabled Terminal (SET).

Until now, the focus of positioning and localization studies has been mainly on determining the position of active devices, and especially user equipment (UEs). There are a wide range of new use-cases in which the aim is to localize objects that are completely without any sort of communication assets, e.g., objects like sofas, tables, moveable walls, etc. These objects can be referred to as "passive" objects, or "non-radio objects." In general, this type of localization can be referred to as device-free localization. The terms "localize" and "localization" are used herein to refer to a determination of an object's location—to "localize" the object is to determine its physical location, while "localization" is the process of doing so. This location may be determined with reference to a three-dimensional coordinate system or, in some cases, only with respect to an object's horizontal position, i.e., the object's two-dimensional position on the surface of the earth.

As noted by Shaufikah Shukri, Latifah Munirah Kamarudin, and Mohd Hafiz Fazalul Rahiman, in an online article "Device-Free Localization for Human Activity Monitoring" (www.intechopen.com/books/intelligent-video-surveillance/device-free-localization-for-human-activity-monitoring):

> Over the past few decades, human activity monitoring has grabbed considerable research attentions due to greater demand for human-centric applications in healthcare and assisted living. For instance, human activity monitoring can be adopted in smart building system to improve the building management as well as the quality of life, especially for the elderly people who are facing health deterioration due to aging factor, without neglecting the important aspects such as safety and energy consumption. The existing human monitoring technology requires additional sensors, such as GPS, PIR sensors, video camera, etc., which incur cost and have several drawbacks. There exist various solutions of using other technologies for human activity monitoring in a smartly controlled environment, either device-assisted or device-free. A radio frequency (RF)-based device-free indoor localization, known as device-free localization (DFL), has attracted a lot of research effort in recent years due its simplicity, low cost, and compatibility with the existing hardware equipped with RF interface.

Additional applications of device-free localization (DFL) are, for instance, advanced driver assistance systems (ADAS) or autonomously moving vehicles that have UE-like capability for positioning and need to track the environment.

SUMMARY

While some techniques have been developed in respect to sensor, vision, acoustic and motion-based device-free localization, this area of research is still in its early phase for exploring the use of different RF signals. Therefore, there are currently no existing solutions for this problem and all different RF signals are being explored on how to be used for this purpose.

Aside from vision-based, motion-based, sound-based, and sensor-based techniques, radio-frequency (RF)-based DFL can use radio signals to collect information from the environment. Typically, DFL concepts based on RF signals are based on the use high-cost and intensive radio fingerprinting methods to collect information.

Another method is to collect information from the surrounding environment by using existing RF signals such as WiFi, Bluetooth or cellular, and using knowledge obtained from these signals for estimating the position of a device-free object.

Exploiting the possibility of high-accuracy UE positioning, this document discloses and discusses a method that can be used to map the location of scatterers in and around a radio propagation environment between a wireless device, such as an LTE or NR UE, and a base station (BS), e.g., an LTE eNB or NR gNB. The techniques described herein can be exploited to perform localization of UE and simultaneously map the UE environment. This type of information can be used for device-free localization.

Various techniques are described in detail below. An example method, according to some of these techniques, comprises the step of obtaining information comprising: (1) a first angle-of-arrival parameter and/or first angle-of-departure parameter corresponding to a non-primary propagation path of a radio signal transmitted between a first wireless device and a second wireless device; and either or both of (2) a delay measurement or time-of-arrival measurement for the non-primary propagation path; and (3) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter. The method further comprises estimating a location for an object other than the first and second wireless devices, based on the obtained information.

Corresponding apparatuses, which may be wireless devices such as a UE or base station, or some other node in a wireless network, are also described in detail below.

DETAILED DESCRIPTION

Figure 1:
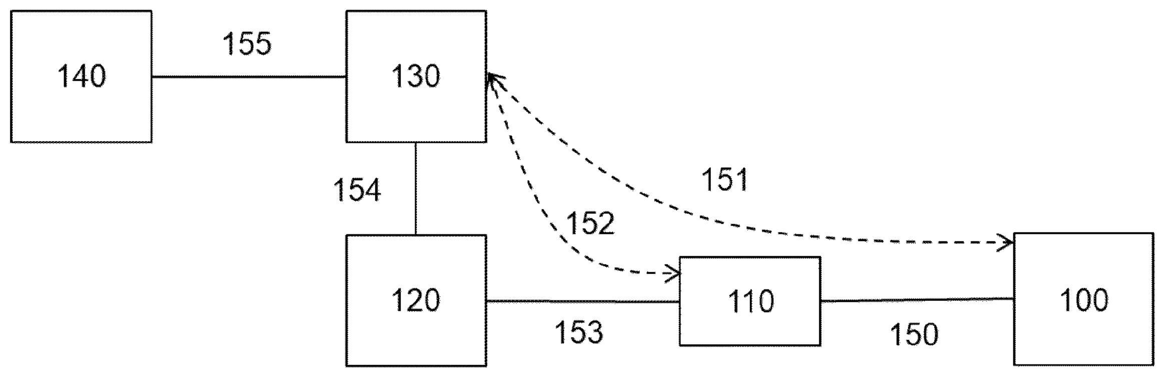
FIG. 1 illustrates an example of positioning architecture.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other.

Various aspects of the techniques and apparatuses may be described with respect to specific messages or specifications of LTE and/or NR networks. This is done for purposes of explanation, and it should be understood that the described principles and techniques may be advantageously applied to other wireless networks.

In this document, the terms network node and RAN node are used interchangeably. A non-limiting example of a network node or a RAN node can be an eNB, gNB, gNB-CU, gNB-CU-CP, gNB-DU. The terms base station (BS) and transmission/reception point (TRP) are also used, and may be interchangeable in many circumstances. In general, a TRP as that term is used herein is a transmitting and receiving node associated with a base station. A base station may be a TRP itself, and/or may be connected to one or several TRPs that are physically separated/distant from the base station.

RAT-based positioning techniques for determining the position of a UE are well known. Some of these rely on timing measurements, and in particular on the time-of-arrival (ToA) of the first path via which the radio signal from the transmitter (Tx) reaches the receiver (Rx) for range estimation. Such range estimation can then be combined with angular measurements or a collection of other range estimates (ranges between a particular UE and multiple BSs) can be used for multilateration to estimate the UE position.

In these methods, information on range and/or angular measurement associated with the other significant paths through which the radio signal from Tx reaches the Rx, because of multipath propagation, are often discarded. This information, however, can be useful to detect "device-free" objects, i.e., object that do not include or that are not associated with a transmitter and/or receiver, or to map the environment.

More particularly, during a positioning occasion, signal-related parameters such as time-of-arrival (ToA), Angle of Departure (AoD), and Angle of Arrival (AoA) may be measured or otherwise determined by the UE or base station when a reference signal for positioning measurements is transmitted by the base station in downlink (DL) and likewise when a reference signal for positioning measurements is transmitted by the UE in Uplink (UL). Today these measurements corresponding only to the first path are performed or reported for the UE positioning purpose. However, measurements corresponding to other paths via which the radio signal transmitted from a Tx is received by a Rx can be exploited to estimate locations of scatterers in and around the radio propagation environment between a Tx and a Rx. Here, a device-free object which requires positioning is the scatterer on the way of the radio signal propagation between the Tx and the Rx.

Solutions for localizing scattering objects, or "device-free objects" are described in further detail below. These solutions may involve one or both of two possible measurement directions, i.e., UL and DL. In either case, it may be assumed, for many of the techniques described herein, that there are BS-UE pairs with known locations. The UE locations may have been obtained by any of the 3GPP positioning methods, by GNSS or any other technology. Furthermore, the proposed method can be easily extended to simultaneous localization of the UE and scatterers around the propagation paths, as will be discussed in further detail below.

In the DL, when measurements of a reference signal transmitted by the BS are performed by the UE, the UE may report measurement corresponding to all significant paths (first significant path is not precluded here) via which it received the reference signal. Note that the term "reference signal" as used herein should be understood to refer to any signal from which measurements or observations are obtained. While Positioning Reference Signals (PRSs) transmitted by the BS are specifically designed for this purpose, other signals may be used. The measurements on these signals can be combined with known UE and transmission/reception point (TRP) positions to determine scatterer locations in and around the radio propagation paths between the UE and BS.

Likewise, in the UL, when the measurements of a signal transmitted by a UE are done by the BS, the BS performs measurement corresponding to all the significant paths (first significant path is not precluded here) via which it received a reference signal. Again, this reference signal might be a signal specifically designed for positioning purposes but may also be any other signal transmitted by the UE, such as a Sounding Reference Signal (SRS). Again, these measurements can be combined with known UE and TRP positions to determine scatterer locations.

The observations of scatterer locations from both UL and DL measurements can be collected by a network node for multiple UE-BS pairs in order to maintain a digital representation of device free objects in the area.

Figure 2:
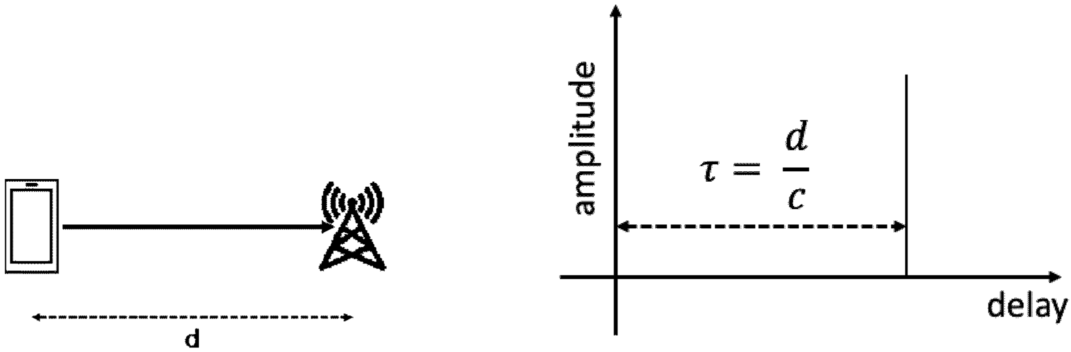
FIG. 2 illustrates line-of-sight (LoS) propagation and a corresponding power delay profile (PDP).

FIG. 2 shows a simple propagation scenario where there is no scatterer in and around the propagation path and only a line-of-sight (LoS) propagation path exists between a Tx and a Rx, as well as a corresponding power delay profile (PDP). In the figure, the UE is acting as a Tx and the BS is serving the purpose of a Rx. This is an example scenario—the communication setup where BS is a Tx and UE is a Rx is not precluded. In such a scenario, only one path is observed in the Power Delay Profile (PDP) as shown in FIG. 2. The delay ($\tau$) of the peak in PDP profile corresponds to the geometric distance between the Tx and Rx in consideration. d in FIG. 1 denotes the distance between the Tx and Rx and c in FIG. 2 denotes the speed of light.

For a specific signal path between a TRP-UE pair, there are corresponding parameters as follows:

DL-AoD is the downlink angle of departure (at the TRP),

DL-AoA is the downlink angle of arrival (at the UE side),

UL-AoD is the uplink angle of departure (at the UE side) and

UL-AoA is the uplink angle of arrival (at the TRP side).

Note that the DL-AoD of a specific path is the same as the UL-AoA when the path is reversed. In the same way, DL-AoA of a specific path is the same as UL-AoD when the path is reversed.

Figure 3:
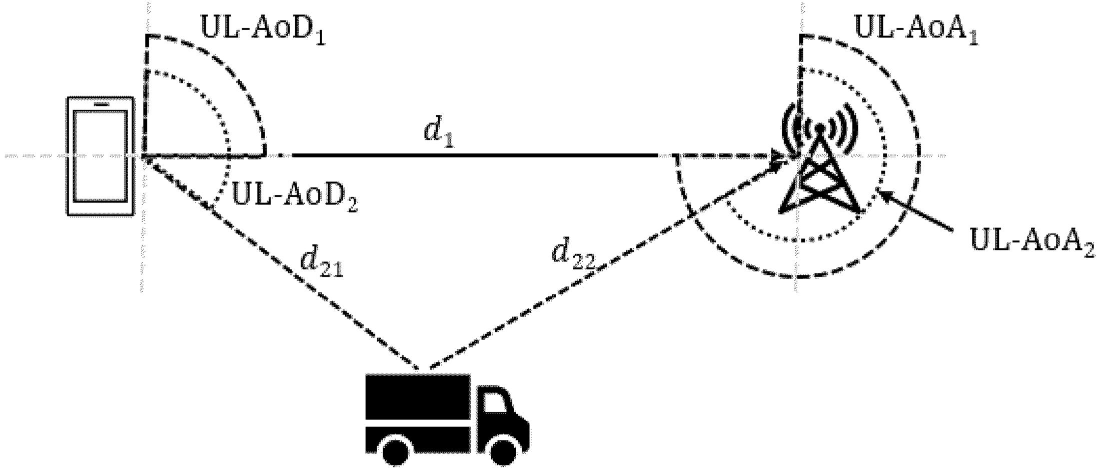
FIG. 3 shows a scenario where there is specular reflection, due to the presence of a scatterer.
Figure 4:
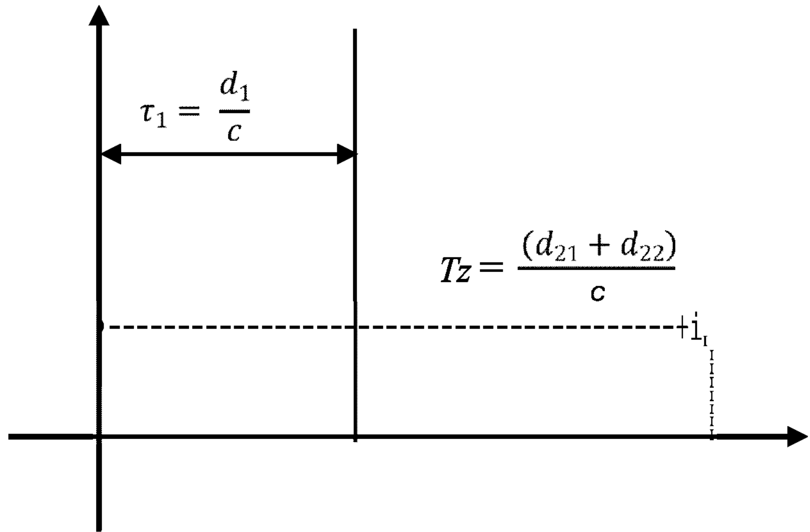
FIG. 4 shows a PDP corresponding to the scenario in FIG. 4.

FIG. 3 shows a communication scenario where there is a scatterer nearby. This scatterer adds a detectable propagation path between the UE and the TRP. In such a scenario, signals transmitted by the Tx reach the Rx via multiple paths. One of these paths is the LoS path, denoted by a black line from UE to BS in the figure. The delay associated to this path, similar to what is shown in FIG. 2, corresponds to the delay due to geometric distance between the Tx and Rx. This is shown in the left-hand portion of the corresponding PDP shown in FIG. 4. Apart from this, additional path that reaches the Rx after hitting the scatterer also exists. For simplicity, the illustrated example considers one scatterer and the specular path generated due to its presence around the propagation path between the Tx and Rx is denoted by a black dashed line in FIG. 3. $d_{21}$ in figure denotes the distance between Tx and the scatterer and $d_{22}$ denotes the distance between the scatterer and the Rx. As shown in FIG. 4, the corresponding peak in PDP appears at a delay of $$\tau_2 = \frac{(d_{21} + d_{22})}{c}.$$

$UL\text{-}AoD_1$ and $UL\text{-}AoD_2$ are the angles at the UE side of the two paths, $UL\text{-}AoA_1$ and $UL\text{-}AoA_2$ are the angles at the TRP side of the two paths. These are shown in FIG. 5.

Figure 5:
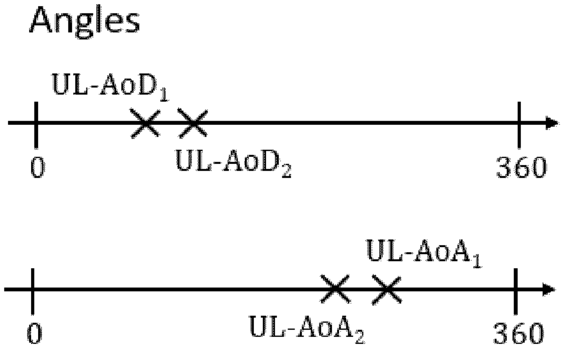
FIG. 5 shows angle-of-arrival (AoA) and angle-of-departure (AoD) observations for each path.

The examples illustrated in FIGS. 2-5 demonstrate two-dimensional geometry of the propagation paths between Tx and Rx in a wireless communication channel. In practice, each of these propagation paths can be associated to AoD at Tx and AoA at Rx, this is also illustrated in FIG. 3 and FIG. 5.

In many of the examples described herein there is only one scatterer, but the techniques described herein apply to any number of scatterers. With m scatterers there will be, in principle, m+1 peaks in the PDP corresponding the delays of the different signal paths, the LoS path also included. For each, i=1, . . . , m+1, the angles UL-AoD$_i$, and UL-AoA$_i$ or DL-AoA$_i$ and DL-AoA$_i$ are distinct.

Locations of scatterers on and around the radio propagation paths between the UE and BS can be computed by combining the multipath profile of the channel and the associated angular information. Exactly how the localization is done may vary, depending on what measurements are available to the node performing the localization.

In the following cases, a UE-TRP pair where the UE position, $p_{UE}$, and the TRP position, $p_{TRP}$, are known is assumed. The measurement inputs are different between the several cases described below, but the output is always a scatterer location observation, $p_s$. In a more complicated procedure described further below, multiple scatterer observations from different UE-TRP pairs and measurements may be combined to map and track the dynamical radio environment with higher precision.

Computing a Scatterer Position from one of DL-AoA/UL-AoD and One of DL-AoD/UL-AoA Measurement Pair.

In a first case, a scatterer's location is determined using either a downlink AoA observation (DL-AoA) or an uplink AoD (UL-AoD) observation, in combination with either a downlink AoD (DL-AoD) observation or an uplink AoA (UL-AoA) observation. These observations may be measured by the node performing the localization procedure or obtained from another node. Note that AoD observations may be observations based on an antenna beamforming setting, rather than a measurement of a signal.

Figure 6:
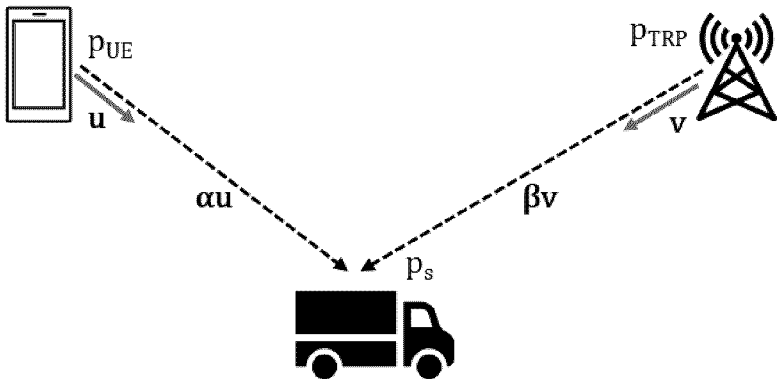
FIG. 6 illustrates a scattering scenario and corresponding parameters.

This case is illustrated in FIG. 6. Let u be the normalized direction vector of DL-AoA/UL-AoD (in 3D) and v the normalized direction vector of DL-AoD/UL-AoA. Then, for the scatterer location it holds that:

$$p_s = p_{UE} + \alpha u,\ \alpha \geq 0, \tag{1a}$$

$$p_s = p_{TRP} + \beta v,\ \beta \geq 0. \tag{1b}$$

This is an equation system with two unknowns, α and β, corresponding to the distances from the UE and TRP to the scatterer, respectively. Ideally, the solution to the equations is the intersection of two rays in 3D. However, due to measurement errors or incorrect positions $p_{UE}$ and $p_{TRP}$, there might not be an exact solution, in which case an approximate solution can be computed, e.g., using a least-squares estimation technique.

Computing a Scatterers Position from ToA and One of DL-AoA/UL-AoD/DL-AoD/UL-AoA Measurement.

In a second case, a scatterer's location is determined using a combination of a time-of-arrival (ToA) measurement in combination with any one of a DL-AoA observation, UL-AoD observation, DL-AoD observation, and UL-AoA observation. Note that here, as elsewhere in this document, it is assumed that the time a given reference signal was transmitted is known (or can be determined), so that a ToA measurement is equivalent to a measurement of the distance traveled by the signal. Note that in the case where the BS and UE locations have been obtained via GPS, the exact time is also known.

Given the same physical layout illustrated in FIG. 6, in this scenario only one of the unit vectors u and v are known, by virtue of the one available AoA or AoD observation. However, the ToA measurement yields a corresponding propagation delay τ for the delay experienced by the signal traveling from the Tx to the Rx, via the scatterer. This delay τ is simply the difference between the time the signal was transmitted and the time it was received. For the delay τ for this scatterer it hold that:

where c is the speed of light.

$$\tau = (\alpha + \beta)/c, \tag{2}$$

If DL-AoA or UL-AoD is available but not DL-AoD or UL-AoA, then we know the vector u in Equation (1a) but not the vector v in Equation (1b). However, from Eq. (1b) we can obtain:

$$|p_s - p_{TRP}| = \beta. \tag{3}$$

Combining equations (1a), (2) and (3) is enough to solve the problem for the unknowns.

If instead UL-AoA or DL-AoD is available but not DL-AoA or UL-AoD, then the vector v in Equation (1b) is known but not the vector u in Equation (1a). From Eq. (1a) we get:

$$|p_s - p_{UE}| = \alpha. \tag{4}$$

Combining equations (1b), (2) and (4) is enough to solve the problem for the unknowns.

Computing a Scatterers Position from ToA, One of DL-AoA/UL-AoD and One of DL-AoD/UL-AoA Measurement.

In a third case, a scatterer's location is determined using a combination of a time-of-arrival (ToA) measurement in combination with a DL-AoA observation or UL-AoD observation and further in combination with DL-AoD observation or UL-AoA observation. In this case we can use the Equations (1a)-(1b) and the ToA measurement Equation (2). Note that the ToA measurement is not strictly necessary to determine the scatterer position, but in the presence of measurement noise it will improve the statistical confidence and accuracy of an approximate (e.g., least squares) solution.

Computing a Scatterers Position from ToA, DL-AoA, UL-AOD, DL-AoA and UL-AoD Measurement.

In a fourth case, a scatterer's location is determined using a combination of a time-of-arrival (ToA) measurement in combination with DL-AoA, UL-AOD, DL-AoA, and UL-AoD observations. Having all DL and UL angle measurements as well as a ToA measurement gives the best possibilities for accurate computation of a scatterer position observation. Equations 1(a), 1(b) and (2) are used. Moreover, since DL-AoA and UL-AoD are two independent observations of the same direction vector, u, they can be combined in a way that gives the best expected accuracy in presence of noise. The same applies to the observations UL-AoA and DL-AoD and the direction vector v.

The computation of the scatterer position observation $p_s$ as specified in the examples described above can be done by the UE or the eNB/gNB, or some network node, for instance the LMF. A network node such as the LMF can process scatterer position observations from multiple TRP-UE pairs and measurement occasions in order to map the environment. It will be appreciated that different pairs of TRP/UE (where one or both of the UE and TRP are different) may have measurements/observations relating to the same scatterer. Thus, ToA, AoA, or AoD observations from two or more different pairs of TRP and UE may be combined to determine the location of a scatterer. Alternatively, observations corresponding to one UE/TRP pair may be used to determine an initial position for the scattering object, with observations from other pairs being used to refine or adjust the estimated position.

In some embodiments, a network node such as an LMF may be configured to receive inputs in the form of scatterer location observations, {ps, i|i=1, . . . } from multiple UEs and/or TRPs. In other embodiments, the network node may receive individual angular and range (delay) measurements that enable it to compute scatterer location observations according to the techniques described above. An objective of this network node may be to maintain a digital representation or map of the environment, including device-free objects for which positions are determined using the techniques disclosed herein. The network node may also have access to other sources of information about the environment, such as 3D maps of buildings, etc. This additional information may be used to error-check or refine the estimations of object positions as determined using the techniques described above.

In some embodiments, upon reception of a scatterer location observation, the network node may compare it with the current digital representation/map of the environment. Based on this comparison, the network node may determine whether the observation originates from a new object that has just entered the scene or whether it should be associated to an already known object. This determination can be used to update the digital representation/map of the environment and device free objects. At this step, the locations of known dynamic (i.e., moving) objects can be updated according to the new observation using, for instance a Kalman filter, or a new object can be instantiated. Note that in maintaining a digital representation/map of the environment, the network node also need functionality to clear from it dynamic objects that have not been observed for some time and therefore can be assumed to have left the scene.

Figure 7:
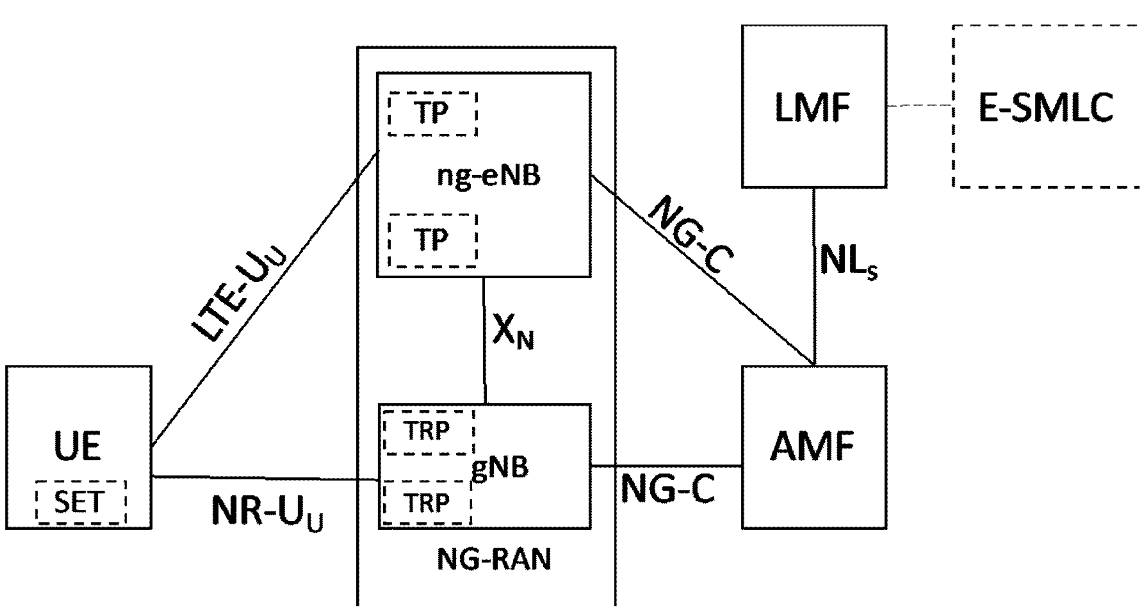
FIG. 7 shows an NR positioning architecture.

FIG. 7 is a simplified diagram of the NR-positioning architecture, illustrating several of the various nodes that may perform some or all of any of the techniques described above. It will be appreciated that these same techniques, or variants thereof, may be implemented in similar/corresponding nodes in an LTE network or other wireless communications network.

From the perspective of the system/structure/node level architecture/platform, the techniques described above can be implemented to exploit any radio link between a UE and a Transmission and Reception Point (TRP) or radio links between a UE and multiple TRPs of a gNB (or other base station), provided the UE location is known to the network by virtue of either RAT based or non-RAT based positioning methods and techniques.

In a situation where the UE position is not known, during a UE-assisted positioning occasion the UE may report measurements such as, but not limited to, AoAs and ToAs of additional significant paths that are associated to the beam containing the PRS resource and that is used to do the positioning measurements. Depending on the UE capability, the UE can report such measurements to multiple associated gNBs. It is worth mentioning here that during a positioning occasion, a UE conventionally only reports positioning measurement related to the first path via which the PRS resource transmitted from a Tx reaches Rx. With the additional reporting describing, the conventional positioning measurements can be used to determine the UE location while the additional measurements reported by the UE are used to create a map with location of scatterers in and around the propagation paths between the UE and TRP/TRPs. An example of the implementation architecture for such a system is shown in FIG. 7.

In a situation where the UE position is already known, during a UE-based positioning occasion the UE may report its position (e.g., as determined by GPS) along with any of the observations/measurements described above, i.e., AoAs and ToAs of additional significant paths associated to the beam containing the PRS resource and used to do the positioning measurements. Again, depending on the UE capability, the UE can report such measurements associated to multiple gNBs. In this case, the UE's self-reported position estimate can be used to localize the scatterers in and around the propagation paths between the UE and TRP/TRPs. Once again, this can be carried out in a network having an architecture like that shown in FIG. 7.

Figure 8:
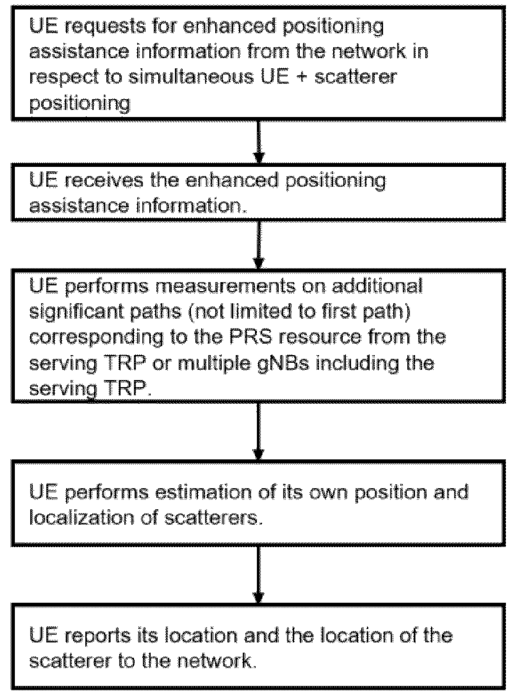
FIGS. 8-15 are process flow diagrams illustrating example methods according to some of the disclosed techniques.

FIGS. 8-13 illustrate example methods according to variants of the techniques described above, from the perspective of several different nodes, e.g., a UE or a network node. FIG. 8, for instance, illustrates a method from the UE perspective (i.e., as carried out by a UE or other wireless device) during a UE-based positioning procedure.

As shown in FIG. 8, the UE may request and receive enhanced positioning assistance information from the network. This positioning assistance information may comprise conventional positioning assistance information, but may also be augmented to account for scatterer position. This information may comprise any of: location information for one or more TRPs, AoD information for one or more signals transmitted by a TRP or TRPs, and AoD and/or ToA information for one or more signals as received at one or more TRPs. This information might also include initial identifications or initial location information for known or suspected scatterers.

As also shown in the figure, the UE performs measurements on at least one PRS resource or other signal from at least one TRP, with those measurements including measurements/observations involving a propagation path other than the "first" path, i.e., other than the most direct path from the TRP to the UE. (The first path might itself be a non-LOS path, in some cases, which can complicate conventional UE positioning. However, the other paths can still be used for localizing scatterers.) Based on these measurements/observations and any assistance data provided by the network, the UE then estimates its own position (if not available from other sources, such as GPS) and localizes one or more scatterers. The UE in this example then reports its location and the location of at least one scatterer to the network.

Figure 9:
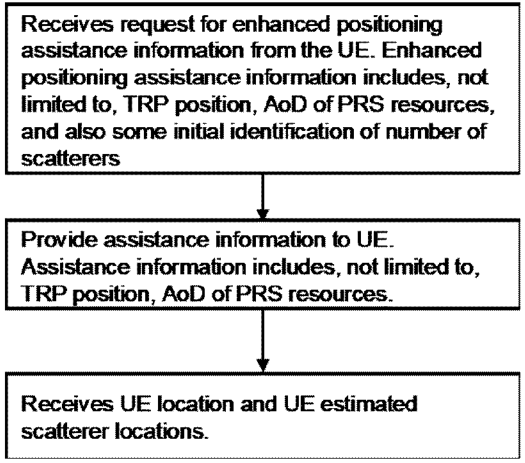

FIG. 9 illustrates actions taken by at least one node in the network, with those actions being directly complementary to the method shown in FIG. 8. As shown in FIG. 9, the network receives a request for enhanced positioning assistance, and provides that assistance information to the UE. This assistance information may comprise any or all of the types of information discussed above, for FIG. 8. The method of FIG. 9 concludes with the network receiving the UE location and the UE-estimated location for at least one scatterer.

Figure 10:
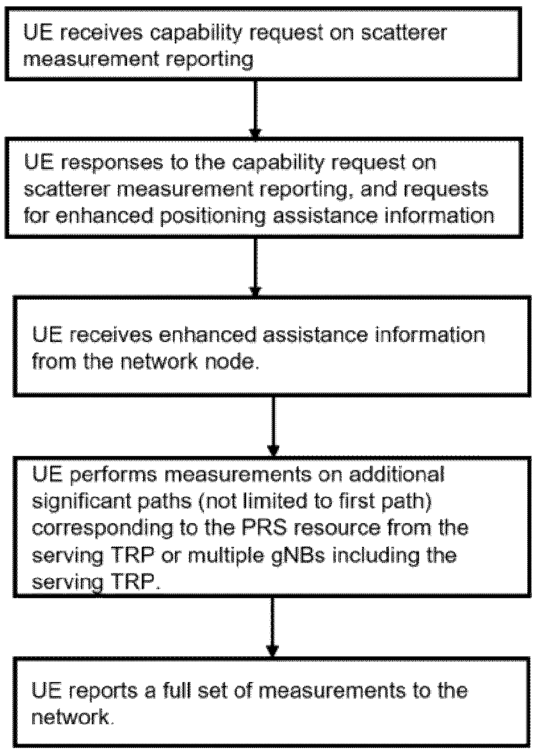

FIG. 10 illustrates an example method, again from the UE perspective, but this time during what might be referred to as a UE-assisted positioning procedure, i.e., a procedure where the UE provides measurements/observations, but does not calculate or estimate a scatterer's location itself. In this example method, the UE receives a capability request relating to its capability to report measurement information for scatterers. As further shown in the figure, the UE responds with its capability information, and, since this UE is assumed to be capable, requests and receives enhanced positioning assistance information. This information may comprise any or all of the sorts of information discussed above, for FIGS. 8 and 9.

As also seen in the figure, the UE then performs measurements on at least one positioning reference signal (PRS) or other signal transmitted to the UE by at least one TRP, to obtain ToA and/or AoA measurements for the signal(s). These may include measurements for what is termed here an "additional significant path," which is a propagation path other than the most significant path in the PDP profile observed by the UE. The UE then reports these measurements to the network, e.g., to an LMF, where a position for a scatterer can be estimated.

Figure 11:
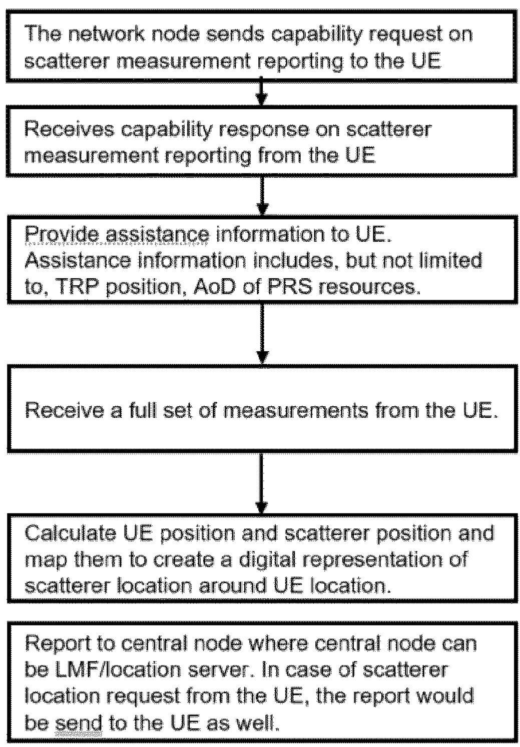

FIG. 11 illustrates the network node operations for an example UE-assisted positioning procedure, in this case complementing the operations shown in FIG. 10. Note that all of the illustrated operations might be performed by a single network node (e.g., an LME or E-SMLC), but these operations might instead be performed by several cooperating nodes, in some embodiments.

As seen in the figure, a network node sends the capability request discussed above, and receives the capability response from a UE. The network node (or another cooperating network node) sends assistance information to the UE; once again, this information may include any or all of the items discussed above in connection with FIGS. 8 and 9.

As also seen in the figure, the network node (or another network node) receives the measurements performed by the UE, as discussed in connection with FIG. 10, and calculates a UE position and scatterer position. If the UE position is already known, this step may comprise simply calculating the scatterer position. In either case, the scatterer position may be added to a digital representation of scatterer location, around the UE's location. Note that as suggested above, data from one or more additional UE/TRP pairs might also be used in calculating a scatterer location, or in refining a previous estimate of a scatterer's location.

As suggested by the last block in FIG. 11, the UE/scatterer position(s) may be reported to a central node, e.g., an LMF, in some embodiments. The UE/scatterer position might also be reported to the UE, in some embodiments, e.g., in response to a request for such, or to one or more other UE's, e.g., as part of assistance information.

Figure 12:
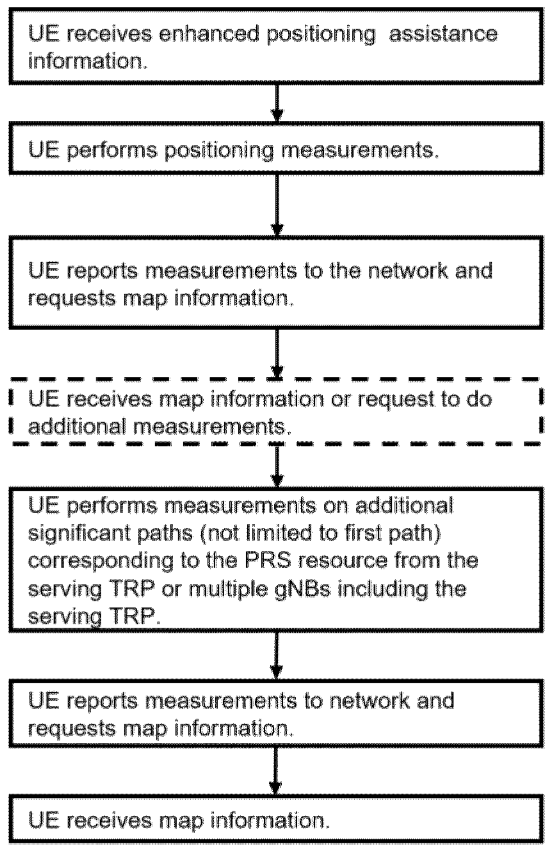

FIG. 12 illustrates another example of a UE-assisted positioning procedure, from the UE perspective. This might be referred to as an "enhanced" UE-assisted positioning procedure. In this example method, the UE receives enhanced positioning assistance information and performs positioning measurements, as in the method shown in FIG. 10. After or when reporting its measurements to the network, however, the UE in this example method may request map information. The UE may receive map information and/or a request to do additional measurements. In response to this request, or in response to seeing scatterers identified on the map, in the vicinity of the UE, the UE performs measurements on additional significant paths for one or more PRSs transmitted by one or more TRPs. These measurements are then reported to the network, and the UE may again request and/or receive map information. As suggested here, embodiments of the presently disclosed techniques may involve iterative measurements, reports, and the like, such that scatterer positions are estimated, updated, and refined over time, to maintain a digital map of scatterers.

Figure 13:
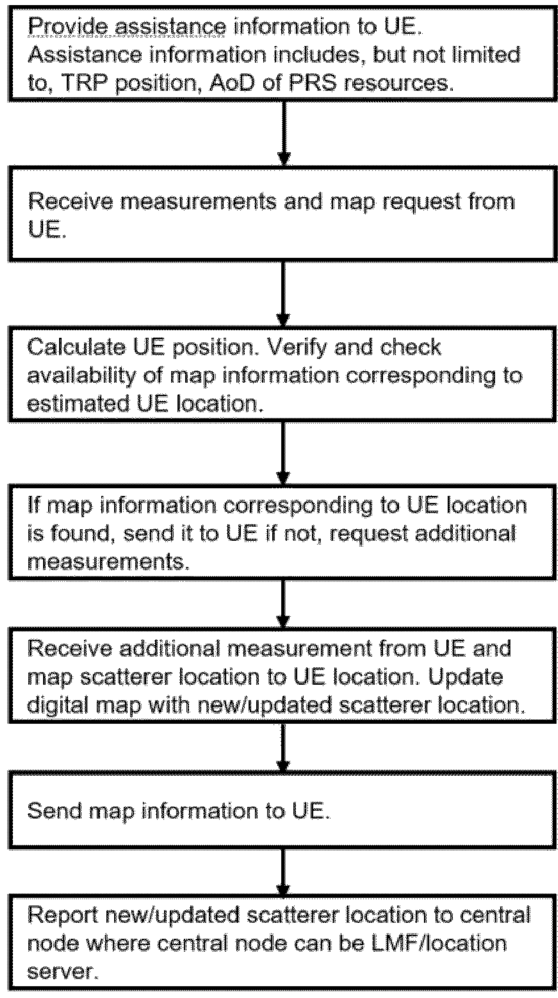

FIG. 13 illustrates the network perspective corresponding to and complementing the UE perspective of FIG. 12.

Figure 14:
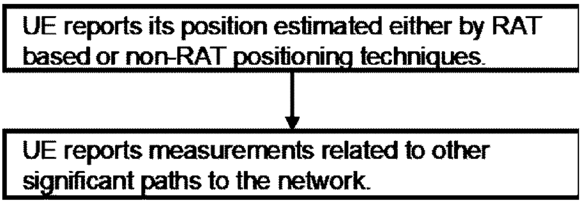
Figure 15:
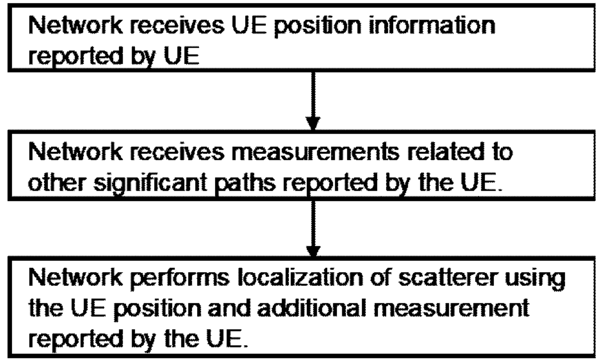

In some embodiments and/or in some instances, the UE position may be known beforehand, e.g., by virtue of RAT-based or non-RAT-based positioning techniques. The signaling may be simplified in some of these embodiments or instances. FIG. 14 and FIG. 15 illustrate the UE and network node perspectives, respectively, of example methods corresponding to this scenario.

The various techniques described above enable the possibility to map the location of device-free objects in and around the radio propagation paths. Such a possibility has a direct impact on realization of new and emerging use cases where UE position along with the UE environment information is critical. Examples of such use cases are Vulnerable Road User (VRU) detection where the VRU does not necessarily is carrying a device with UE like capability and the radio links for Vehicle to Everything (V2X) are being used to localize the vehicle and potentially to estimate presence and position of a VRU in the close proximity of the vehicle for collision avoidance type of solution. The proposed method and solution will also have an implication on realization of autonomous vehicle use case where safe navigation without human intervention demands precise vehicle positioning and scatterer localization. Moreover, the proposed techniques can be used to create a digital "twin" of an environment where the UE is located.

The observations of scatterers that are obtained in this way may in some cases be inaccurate, but still useful to a network node that continuously collects new observations from different UEs/TRPs to maintain a database of device free objects (scatterers) in the environment over time. This way new objects that appear can be identified as well as objects that disappear. Such procedure can also be useful when it is important to distinguish the stationary environment from objects that enter or leave a certain area dynamically.

Figure 16:
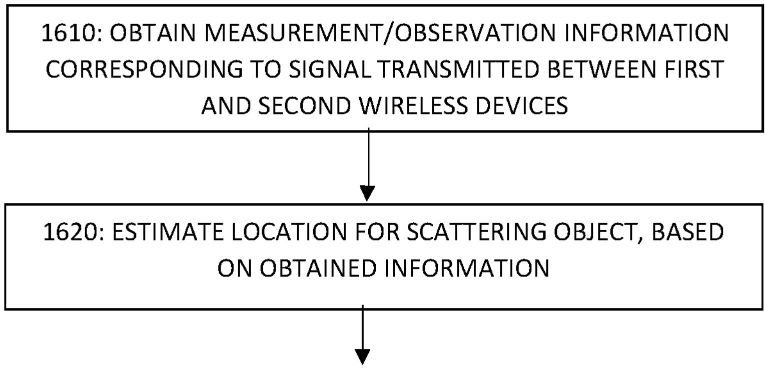
FIG. 16 is a process flow diagram illustrating an example method according to some of the disclosed techniques.

In view of the several techniques and variants described above, any combinations of which may be used together, in some embodiments, it will be appreciated that FIG. 16 is a process flow diagram illustrating a method, in a wireless device or network node operating in a wireless network, for determining a location of a scatterer, i.e., "localizing" a scatterer. The illustrated method may be understood as a generalization of several of the techniques described in detail above and may, in various embodiments, be carried out by a wireless device such as a UE, or by a network node such as a gNB or location server. All of the various details and variations described above are directly applicable to the illustrated method.

As shown at block 1610, the illustrated method comprises the step of obtaining certain measurement and/or observation information relating to a positioning reference signal or other signal. This information comprises: (1) a first angle-of-arrival parameter and/or first angle-of-departure parameter corresponding to a non-primary propagation path of a radio signal transmitted between a first wireless device and a second wireless device; (2) a delay measurement or time-of-arrival measurement for the non-primary propagation path; and/or (3) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter. To be clear, this information may comprise (1) and (2), or (1) and (3), or (1) and (2) and (3), in various embodiments or instances. Note that here and elsewhere in this document, the term "wireless device" should be understood as generally as possible, and in particular should be understood as encompassing a base station or other TRP, as discussed above, as well as a UE or other access device. Thus, the propagation path described here may be between a UE and a TRP, between two UEs, or even between two TRPs.

As shown at block 1620, the illustrated method further comprises estimating a location for an object other than the first and second wireless devices, based on the obtained information. This may involve any of the techniques described above. Note that the "object other than the first and second wireless device" may be a scattering object of any type, located on a non-primary propagation path between the first and second wireless devices, including what might be referred as a "device-free object."

The term "obtaining" as used here should also be understood generally. In some embodiments or instances of the method of FIG. 16, for example, obtaining the first angle-of-arrival parameter or first angle-of-departure parameter may comprise measuring the first angle-of-arrival parameter or first angle-of-departure parameter based on at least one signal transmitted between the first and second wireless devices, while obtaining the delay measurement or the time-of-arrival measurement or the second angle-of-arrival parameter or the second angle-of-departure parameter may comprise measuring the delay measurement or the time-of-arrival measurement or the second angle-of-arrival parameter or the second angle-of-departure parameter based on at least one signal transmitted between the first and second wireless devices.

Likewise, in some embodiments or instances where the method is performed by a first one of the first and second wireless devices, e.g., by a UE, obtaining the first angle-of-arrival parameter or first angle-of-departure parameter may comprise receiving the first angle-of-arrival parameter or first angle-of-departure parameter from the other of the first and second wireless devices, and obtaining the delay measurement or the time-of-arrival measurement or the second angle-of-arrival parameter or the second angle-of-departure parameter may comprise measuring the delay measurement or the time-of-arrival measurement or the second angle-of-arrival parameter or the second angle-of-departure parameter based on at least one signal transmitted between the first and second wireless devices.

Similarly, in other embodiments or instances where the illustrated method is performed by a first one of the first and second wireless devices, obtaining the first angle-of-arrival parameter or first angle-of-departure parameter may comprise receiving the first angle-of-arrival parameter or first angle-of-departure parameter from the other of the first and second wireless devices, and obtaining the delay measurement or the time-of-arrival measurement or the second angle-of-arrival parameter or the second angle-of-departure parameter may comprise receiving the delay measurement or the time-of-arrival measurement or the second angle-of-arrival parameter or the second angle-of-departure parameter from the other of the first and second wireless devices. Other combinations of received and measured observations/measurements are possible.

In some embodiments or instances of the method shown in FIG. 16, estimating the location of the object is performed may be based on location information for the first and/or second wireless devices. In some of these embodiments or instances, the method may further comprise receiving, from at least one of the first and second wireless devices, location information for at least one of the first and second wireless devices.

In some embodiments or instances, the method is performed by a first one of the first and second wireless devices and comprises reporting the estimated location for the object to the other one of the first and second wireless devices.

In various embodiments, the first wireless device is a user equipment, UE, and the second wireless device is a base station. Other combinations of wireless devices are possible.

In some embodiments or instances, the method shown in FIG. 16 may further comprise comparing the estimated location to a digital map of scatterers to determine whether the estimated location corresponds to an already identified scatterer or corresponds to a potentially new scatterer.

In some of these and in other embodiments or instances, the estimating step shown in FIG. 16 may comprise combining the first angle-of-arrival parameter or first angle-of-departure parameter and the delay measurement or time-of-arrival measurement or second angle-of-arrival parameter or second angle-of-departure parameter with angle measurements and/or time-of-arrival or delay measurements corresponding to a non-primary propagation path for a radio signal between a pair of devices differing from the first and second wireless devices.

Figure 17:
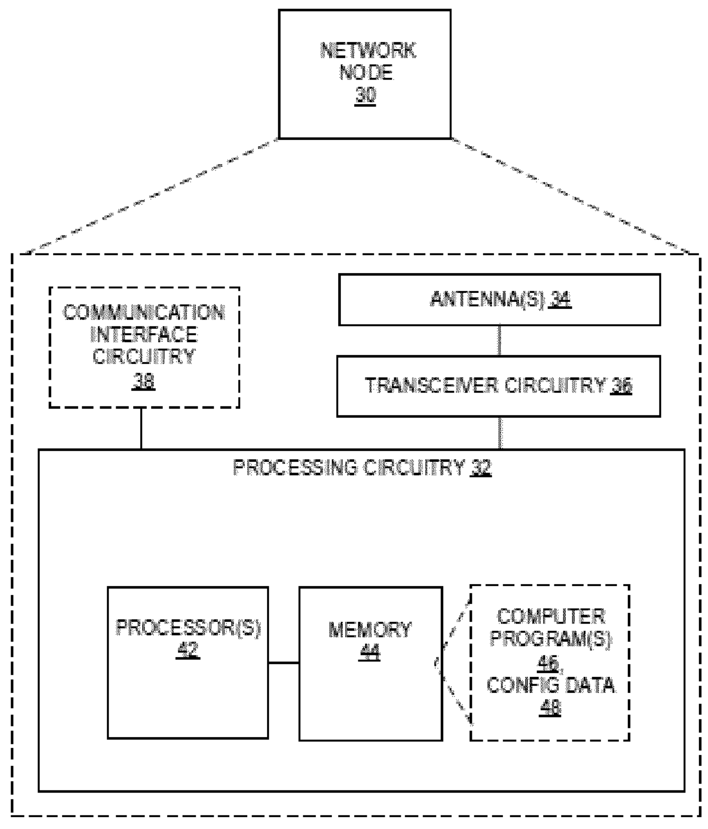
FIG. 17 is a block diagram illustrating an example network node.

FIG. 17 shows a network node 30, which may be configured to carry out all or parts of one or more of the techniques disclosed herein. More particularly, network node 30, which in the illustrated example is a radio network node (because it includes a radio for communicating with one or more UEs), such as a gNB or eNB, may perform any of those operations attributed in the above discussion to a network node. In particular, network node 30 may carry out all or parts of a method according to FIG. 16.

Network node 30 may be an evolved Node B (eNodeB), Node B, or gNB, for example. While a radio network node 30 is shown in FIG. 7, the operations can be performed by other kinds of network nodes, including a radio network node such as base station, radio base station, base transceiver station, base station controller, network controller, NR base station (BS), Multi-cell/multicast Coordination Entity (MCE), relay node, access point, radio access point, Remote Radio Unit (RRU) Remote Radio Head (RRH), or a multi-standard BS (MSR BS). Network node 30 may also, in some cases, be a core network node (e.g., MME, SON node, a coordinating node, positioning node, MDT node, etc.), or even an external node (e.g., 3rd party node, a node external to the current network), etc. Network node 30 may also comprise test equipment.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Some embodiments of network node 30 communicate with wireless devices using antennas 34 and transceiver circuitry 36. Some of these and some other embodiments may communicate with one or more relay nodes using antennas 34 and transceiver circuitry 36, e.g., using antennas 34 and transceiver circuitry 36 to communicate with an MT part of a relay node. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed herein.

Processing circuitry 32 of the network node 30 is configured, according to some embodiments, to perform all or part of the techniques described herein for one or more network nodes of a wireless communication system, including, for example, the methods described in connection with FIG. 6.

Figure 18:
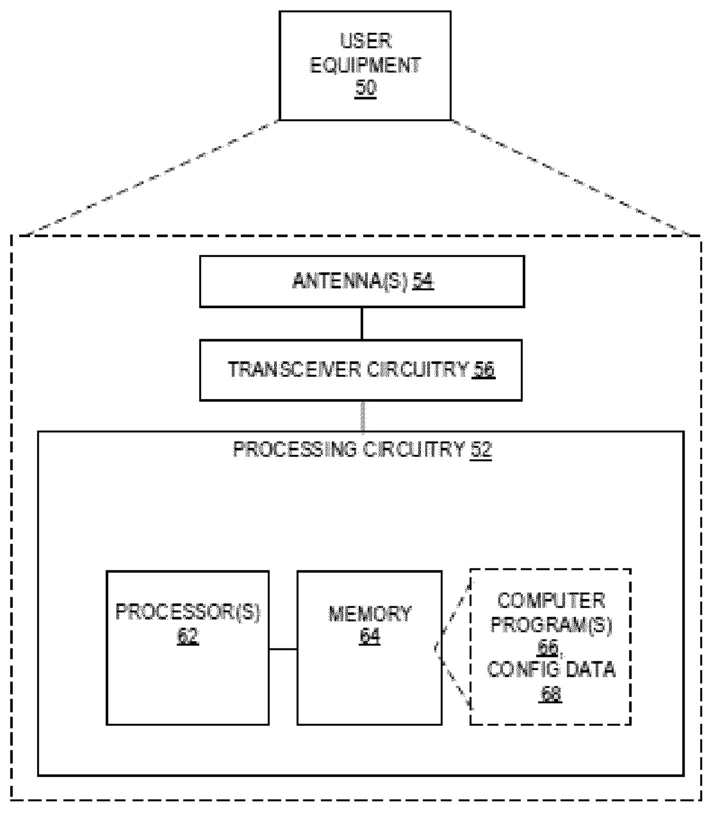
FIG. 18 is a block diagram illustrating an example UE, according to some embodiments.

FIG. 18 illustrates a diagram of a UE 50 configured to carry out all or parts of one or more of the techniques described herein, according to some embodiments. UE 50 may be considered to represent any wireless devices or mobile terminals that may operate in a network, such as a UE in a cellular network. Other examples may include a communication device, target device, device to device (D2D) UE, machine type UE or UE capable of machine-to-machine communication (M2M), a sensor equipped with UE, PDA (personal digital assistant), tablet, IPAD tablet, smart phone, laptop embedded equipped (LEE), laptop mounted equipment (LME), USB dongles, Customer Premises Equipment (CPE), etc.

UE 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to multiple radio access technologies, for the purposes of using cellular communication services. The radio access technologies can be NR and/or LTE for the purposes of this discussion.

UE 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by UE 50. Processing circuitry 52 may be configured, e.g., through the use of appropriate program code stored in memory 64, to carry out one or more of the methods and/or signaling processes discussed above, including those discussed in connection with FIG. 16.

Processing circuitry 52 of the UE 50 is configured, according to some embodiments, to perform any methods that support or correspond with the techniques described herein for the network nodes or base station.

While the techniques described above relate to estimating the positions of scatterers in a radio environment, and thus do not apply directly to the handling of user data, such as application data transferred to and from an applications server in a data network, it will be appreciated that the presently disclosed techniques may be implemented to enable and/or improve the speed and efficiency of new use cases, such as V2V applications, and thus may indirectly improve the operation and efficiency of the a wireless device's operation with respect to user-driven applications, whether those applications are voice, video, or data-based applications or services.

Figure 19:
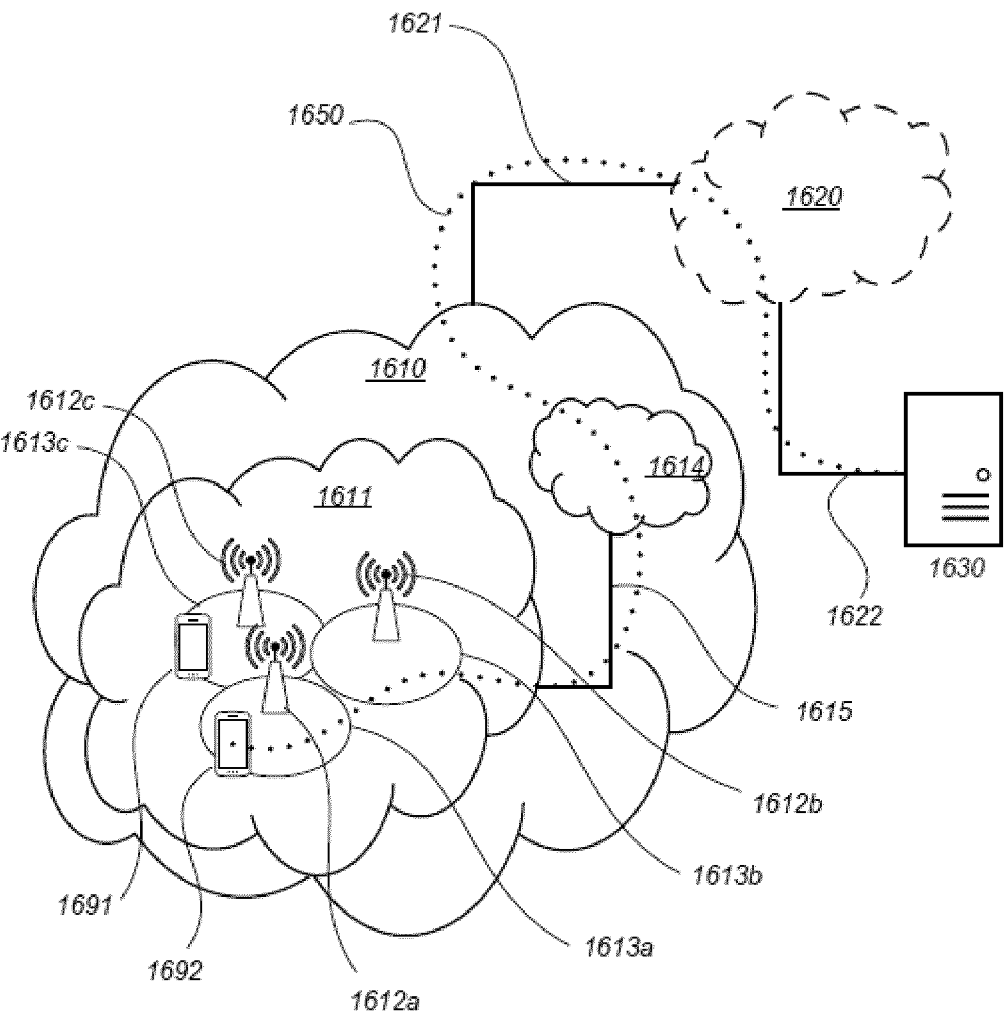
FIG. 19 illustrates an example telecommunication network connected to a host via an intermediate network, in accordance with some embodiments.

FIG. 19, according to some embodiments, illustrates a communication system that includes a telecommunication network 1610, such as a 3GPP-type cellular network, which comprises an access network 1611, such as a radio access network, and a core network 1614. The access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to the core network 1614 over a wired or wireless connection 1615. A first UE 1691 located in coverage area 1613*c* is configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 19 enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 may not or need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 20.

In communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 20) served by the base station 1720. The communication interface 1726 may be configured to facilitate a connection 1760 to the host computer 1710. The connection 1760 may be direct or it may pass through a core network (not shown in FIG. 20) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1717. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 20:
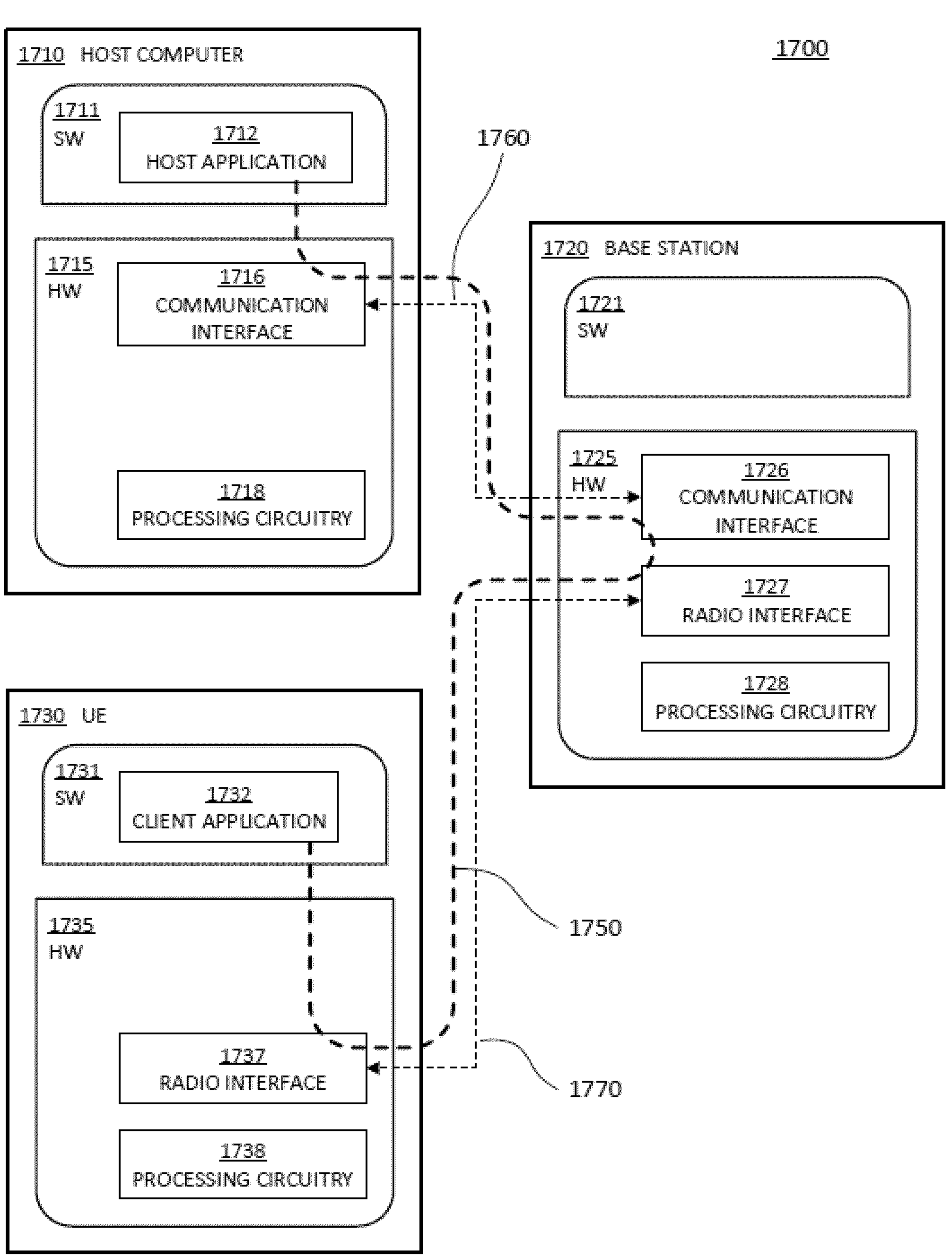
FIG. 20 illustrates a host computer communicating over a partially wireless connection with, in accordance with some embodiments.

It is noted that the host computer 1710, base station 1720 and UE 1730 illustrated in FIG. 20 may be identical to the host computer 1630, one of the base stations 1612*a*, 1612*b*, 1612*c* and one of the UEs 1691, 1692 of FIG. 19, respectively. This is to say, the inner workings of these entities may be as shown in FIG. 10 and independently, the surrounding network topology may be that of FIG. 19.

In FIG. 20, the OTT connection 1750 has been drawn abstractly to illustrate the communication between the host computer 1710 and the use equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure, such as provided by nodes such as UE 50 and network node 30, along with the corresponding methods 1200, 1300, 1400. The embodiments described herein allow IAB nodes and UEs to more efficiently respond to and react to network problems, such as the failure of a backhaul link, and more particularly provide more efficient release techniques in the event of such a failure. The teachings of these embodiments may improve the reliability, data rate, capacity, latency and/or power consumption for the network and UE 1730 using the OTT connection 1750 for emergency warning systems and thereby provide benefits such as more efficient and targeted emergency messaging that saves on network and UE resources while improving the ability of users to take safe action.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular, empty or 'dummy' messages, using the OTT connection 1750 while it monitors propagation times, errors etc.

Figure 21:
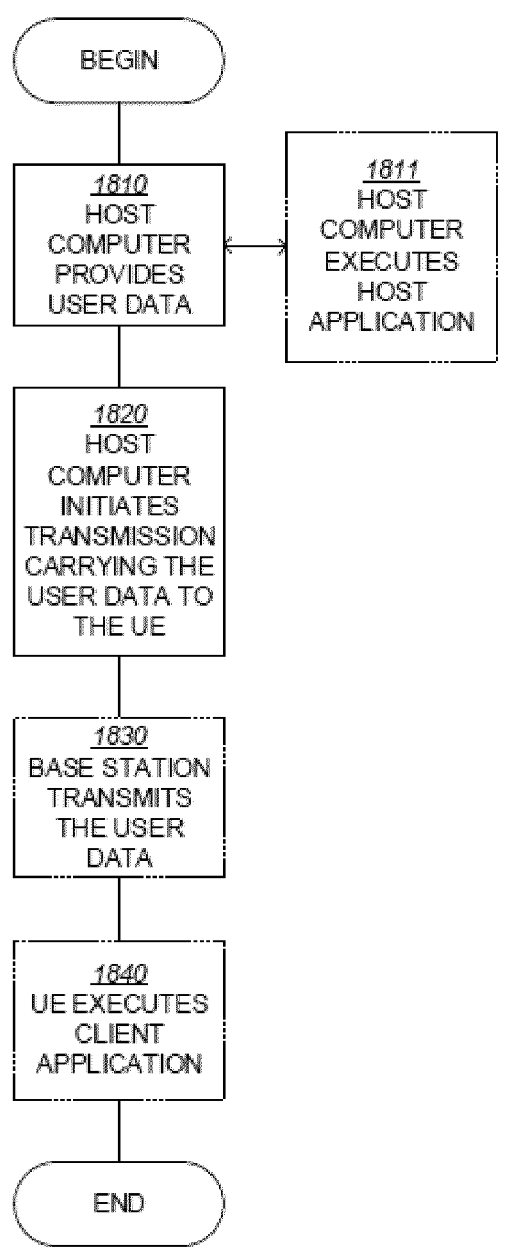
FIG. 21 is a flowchart illustrating methods implemented in a communication system that includes a host computer, a base station, and a user equipment, in accordance with some embodiments.

FIG. 21 is a flowchart illustrating a method implemented in a communication system, in accordance with one embodiment.

The communication system includes a host computer, a base station and a UE which may be those described with reference to FIGS. 17 and 18. For simplicity of the present disclosure, only drawing references to FIG. 21 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

Figure 22:
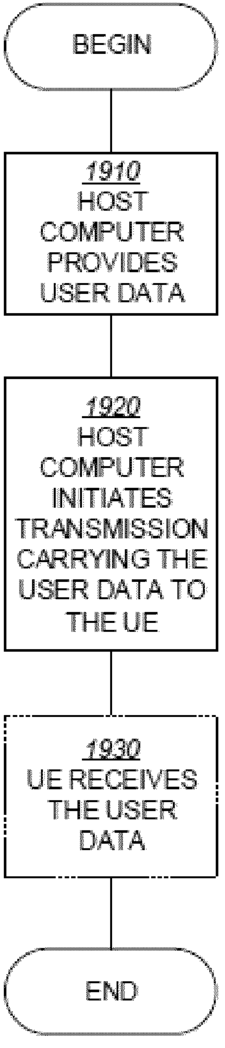
FIG. 22 is another flowchart illustrating methods implemented in a communication system that includes a host computer, a base station, and a user equipment, in accordance with some embodiments.

FIG. 22 is a flowchart illustrating a method implemented in a communication system, in accordance with one embodiment.

The communication system includes a host computer, a base station and a UE which may be those described with reference to FIGS. 17 and 18. For simplicity of the present disclosure, only drawing references to FIG. 22 will be included in this section. In a first step 1910 of the method, the host computer provides user data. In an optional substep (not shown), the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

Figure 23:
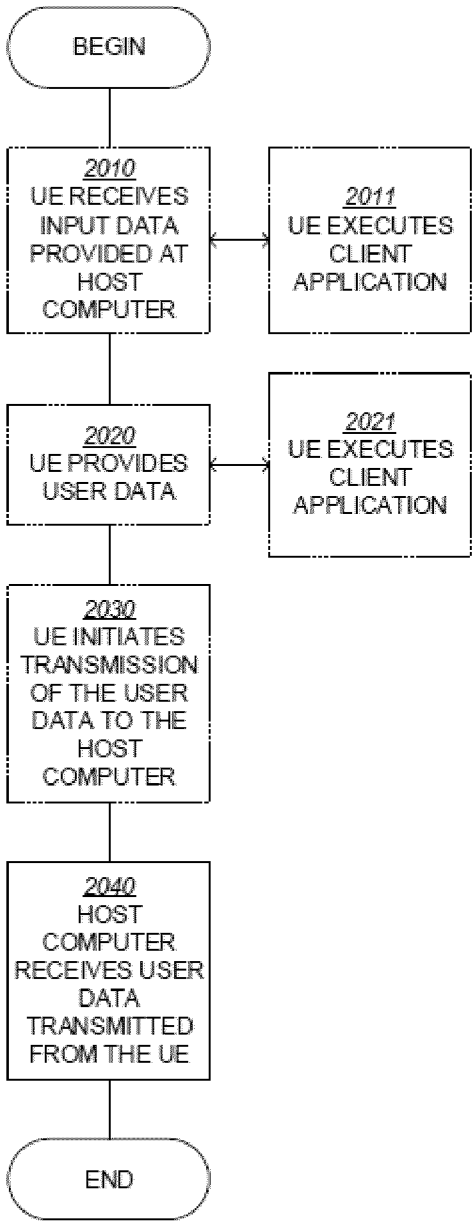
FIG. 23 shows another flowchart illustrating methods implemented in a communication system that includes a host computer, a base station, and a user equipment, in accordance with some embodiments.

FIG. 23 is a flowchart illustrating a method implemented in a communication system, in accordance with one embodiment.

The communication system includes a host computer, a base station and a UE which may be those described with reference to FIGS. 17 and 18. For simplicity of the present disclosure, only drawing references to FIG. 23 will be included in this section. In an optional first step 2010 of the method, the UE receives input data provided by the host computer. Additionally, or alternatively, in an optional second step 2020, the UE provides user data. In an optional substep 2021 of the second step 2020, the UE provides the user data by executing a client application. In a further optional substep 2011 of the first step 2010, the UE executes a client application which provides the user data in reaction to the received input data provided by the host computer. In providing the user data, the executed client application may further consider user input received from the user.

Regardless of the specific manner in which the user data was provided, the UE initiates, in an optional third substep 2030, transmission of the user data to the host computer. In a fourth step 2040 of the method, the host computer receives the user data transmitted from the UE, in accordance with the teachings of the embodiments described throughout this disclosure.

FIG. 24 is a flowchart illustrating a method implemented in a communication system, in accordance with one embodiment.

The communication system includes a host computer, a base station and a UE which may be those described with reference to FIGS. 17 and 18. For simplicity of the present disclosure, only drawing references to FIG. 24 will be included in this section. In an optional first step 2110 of the method, in accordance with the teachings of the embodiments described throughout this disclosure, the base station receives user data from the UE. In an optional second step 2120, the base station initiates transmission of the received user data to the host computer. In a third step 2130, the host computer receives the user data carried in the transmission initiated by the base station.

As discussed in detail above, the techniques described herein, e.g., as illustrated in the process flow diagram of FIG. 16, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

EXAMPLE EMBODIMENTS

Embodiments of the techniques and apparatuses described above include, but are not limited to, the following enumerated examples:

1. A method for determining a location of an object, the method comprising:

obtaining information comprising:

(1) a first angle-of-arrival parameter and/or first angle-of-departure parameter corresponding to a non-primary propagation path of a radio signal transmitted between a first wireless device and a second wireless device; and (2) a delay measurement or time-of-arrival measurement for the non-primary propagation path; and/or (3) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimating a location for an object other than the first and second wireless devices, based on the obtained information.

2. The method of example embodiment 1, wherein:

obtaining the first angle-of-arrival parameter or first angle-of-departure parameter comprises measuring the first angle-of-arrival parameter or first angle-of-departure parameter based on at least one signal transmitted between the first and second wireless devices; and obtaining the delay measurement or the time-of-arrival measurement or the second angle-of-arrival parameter or the second angle-of-departure parameter comprises measuring the delay measurement or the time-of-arrival measurement or the second angle-of-arrival parameter or the second angle-of-departure parameter based on at least one signal transmitted between the first and second wireless devices.

3. The method of example embodiment 1, wherein:

the method is performed by a first one of the first and second wireless devices;

obtaining the first angle-of-arrival parameter or first angle-of-departure parameter comprises receiving the first angle-of-arrival parameter or first angle-of-departure parameter from the other of the first and second wireless devices; and obtaining the delay measurement or the time-of-arrival measurement or the second angle-of-arrival parameter or the second angle-of-departure parameter comprises measuring the delay measurement or the time-of-arrival measurement or the second angle-of-arrival parameter or the second angle-of-departure parameter based on at least one signal transmitted between the first and second wireless devices.

4. The method of example embodiment 1, wherein:

the method is performed by a first one of the first and second wireless devices;

obtaining the first angle-of-arrival parameter or first angle-of-departure parameter comprises receiving the first angle-of-arrival parameter or first angle-of-departure parameter from the other of the first and second wireless devices; and obtaining the delay measurement or the time-of-arrival measurement or the second angle-of-arrival parameter or the second angle-of-departure parameter comprises receiving the delay measurement or the time-of-arrival measurement or the second angle-of-arrival parameter or the second angle-of-departure parameter from the other of the first and second wireless devices.

5. The method of any one of example embodiments 1-4, wherein estimating the location of the object is performed based further on location information for the first and/or second wireless devices.

6. The method of example embodiment 5, wherein the method further comprises receiving, from at least one of the first and second wireless devices, location information for at least one of the first and second wireless devices.

7. The method of any of example embodiments 1-6, wherein the method is performed by a first one of the first and second wireless devices and comprises reporting the estimated location for the object to the other one of the first and second wireless devices.

8. The method of any of example embodiments 1-7, wherein the first wireless device is a user equipment, UE, and the second wireless device is a base station.

9. The method of any of example embodiments 1-8, wherein the method further comprises comparing the estimated location to a digital map of scatterers to determine whether the estimated location corresponds to an already identified scatterer or corresponds to a potentially new scatterer.

10. The method of any of example embodiments 1-9, wherein said estimating comprises combining the first angle-of-arrival parameter or first angle-of-departure parameter and the delay measurement or time-of-arrival measurement or second angle-of-arrival parameter or second angle-of-departure parameter with angle measurements and/or time-of-arrival or delay measurements corresponding to a non-primary propagation path for a radio signal between a pair of devices differing from the first and second wireless devices.

11. A wireless device, comprising:

transceiver circuitry; and processing circuitry operatively associated with the transceiver circuitry and configured to: obtain information comprising:

(1) a first angle-of-arrival parameter and/or first angle-of-departure parameter corresponding to a non-primary propagation path of a radio signal transmitted between a first wireless device and a second wireless device; and (2) a delay measurement or time-of-arrival measurement for the non-primary propagation path; and/or (3) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimate a location for an object other than the first and second wireless devices, based on the obtained information.

12. The wireless device of example embodiment 11, wherein the processing circuitry is configured to:

obtain the first angle-of-arrival parameter or first angle-of-departure parameter by measuring the first angle-of-arrival parameter or first angle-of-departure parameter based on at least one signal transmitted between the first and second wireless devices; and obtain the delay measurement or the time-of-arrival measurement or the second angle-of-arrival parameter or the second angle-of-departure parameter by measuring the delay measurement or the time-of-arrival measurement or the second angle-of-arrival parameter or the second angle-of-departure parameter based on at least one signal transmitted between the first and second wireless devices.

13. The wireless device of example embodiment 11, wherein the wireless device is a first one of the first and second wireless devices, and the processing circuitry is configured to:

obtain the first angle-of-arrival parameter or first angle-of-departure parameter by receiving the first angle-of-arrival parameter or first angle-of-departure parameter from the other of the first and second wireless devices; and obtain the delay measurement or the time-of-arrival measurement or the second angle-of-arrival parameter or the second angle-of-departure parameter by measuring the delay measurement or the time-of-arrival measurement or the second angle-of-arrival parameter or the second angle-of-departure parameter based on at least one signal transmitted between the first and second wireless devices.

14. The wireless device of example embodiment 11, wherein the wireless device is a first one of the first and second wireless devices, and the processing circuitry is configured to:

obtain the first angle-of-arrival parameter or first angle-of-departure parameter by receiving the first angle-of-arrival parameter or first angle-of-departure parameter from the other of the first and second wireless devices; and obtain the delay measurement or the time-of-arrival measurement or the second angle-of-arrival parameter or the second angle-of-departure parameter by receiving the delay measurement or the time-of-arrival measurement or the second angle-of-arrival parameter or the second angle-of-departure parameter from the other of the first and second wireless devices.

15. The wireless device of any one of example embodiments 11-14, wherein the processing circuitry is configured to estimate the location of the object based further on location information for the first and/or second wireless devices.

16. The wireless device of example embodiment 15, wherein the processing circuitry is configured to receive, from at least one of the first and second wireless devices, location information for at least one of the first and second wireless devices.

17. The wireless device of any of example embodiments 11-16, wherein the wireless device is a first one of the first and second wireless devices, and the processing circuitry is configured to report the estimated location for the object to the other one of the first and second wireless devices.

18. The wireless device of any of example embodiments 11-17, wherein the first wireless device is a user equipment, UE, and the second wireless device is a base station.

19. The wireless device of any of example embodiments 11-18, wherein the processing circuitry is further configured to compare the estimated location to a digital map of scatterers to determine whether the estimated location corresponds to an already identified scatterer or corresponds to a potentially new scatterer.

20. The wireless device of any of example embodiments 11-19, wherein the processing circuitry is configured to estimate the location for the object by combining the first angle-of-arrival parameter or first angle-of-departure parameter and the delay measurement or time-of-arrival measurement or second angle-of-arrival parameter or second angle-of-departure parameter with angle measurements and/or time-of-arrival or delay measurements corresponding to a non-primary propagation path for a radio signal between a pair of devices differing from the first and second wireless devices.

21. A network node, comprising:

communications interface circuitry configured to communicate with one or more other network nodes; and processing circuitry operatively associated with the communications interface circuitry and configured to:

obtain information comprising:

(1) a first angle-of-arrival parameter and/or first angle-of-departure parameter corresponding to a non-primary propagation path of a radio signal transmitted between a first wireless device and a second wireless device; and (2) a delay measurement or time-of-arrival measurement for the non-primary propagation path; and/or (3) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimate a location for an object other than the first and second wireless devices, based on the obtained information.

22. The network node of example embodiment 21, wherein the processing circuitry is configured to obtain the information by receiving the information from the first and second wireless devices.

23. The network node of example embodiment 22, wherein the processing circuitry is configured to:

obtain the first angle-of-arrival parameter or first angle-of-departure parameter by receiving the first angle-of-arrival parameter or first angle-of-departure parameter from a first one of the first and second wireless devices; and obtain the delay measurement or the time-of-arrival measurement or the second angle-of-arrival parameter or the second angle-of-departure parameter by receiving the delay measurement or the time-of-arrival measurement or the second angle-of-arrival parameter or the second angle-of-departure parameter from the other of the first and second wireless devices.

24. The network node of any one of example embodiments 21-23, wherein the processing circuitry is configured to estimate the location of the object based further on location information for the first and/or second wireless devices.

25. The network node of example embodiment 24, wherein the processing circuitry is configured to receive, from at least one of the first and second wireless devices, location information for at least one of the first and second wireless devices.

26. The network node of any of example embodiments 21-25, wherein the network node is configured to report the estimated location for the object to at least one of the first and second wireless devices.

27. The network node of any of example embodiments 21-26, wherein the first wireless device is a user equipment, UE, and the second wireless device is a base station.

28. The network node of any of example embodiments 21-27, wherein the processing circuitry is further configured to compare the estimated location to a digital map of scatterers to determine whether the estimated location corresponds to an already identified scatterer or corresponds to a potentially new scatterer.

29. The wireless device of any of example embodiments 21-28, wherein the processing circuitry is configured to estimate the location for the object by combining the first angle-of-arrival parameter or first angle-of-departure parameter and the delay measurement or time-of-arrival measurement or second angle-of-arrival parameter or second angle-of-departure parameter with angle measurements and/or time-of-arrival or delay measurements corresponding to a non-primary propagation path for a radio signal between a pair of devices differing from the first and second wireless devices.

30. A wireless device adapted to perform a method according to any one of example embodiments 1-10.

31. A network node adapted to perform a method according to any one of example embodiments 1-10.

32. A computer program product comprising computer program instructions configured so that, when executed on at least one processing circuit of a wireless device, the computer program instructions cause the wireless device to carry out a method according to any one of example embodiments 1-10.

33. A computer-readable medium comprising, stored thereupon, the computer program product of example embodiment 32.

34. A computer program product comprising computer program instructions configured so that, when executed on at least one processing circuit of a network node or base station, cause the network node or base station to carry out a method according to any one of example embodiments 1-10.

35. A computer-readable medium comprising, stored thereupon, the computer program product of example embodiment 34.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents and shall not be restricted or limited by the foregoing detailed description.

ABBREVIATIONS

| Abbreviation | Explanation |
|---|---|
| 3GPP | 3rd Generation Partnership Project |
| 4G | Fourth Generation |
| 5GC | 5G Core |
| AMF | Access and Mobility management Function |
| AoA | Angle of Arrival |
| BS | Base Station |
| DFL | Device Free Localization |
| DL | Downlink |
| DoA | Direction of Arrival |
| E-SMLC | Evolved Serving Mobile Location Center |
| EPC | Evolved Packet Core |
| GNSS | Global Navigation Satellite System |
| GPS | Global Positioning System |
| LMF | Location Management Function |
| LoS | Line of Sight |
| LPP | LTE Positioning Protocol |
| LPPa | LTE Positioning Protocol Annex |
| LTE | Long Term Evolution |
| MME | Mobility Management Entity |
| NR | New Radio |
| OMA | Open Mobile Alliance |
| PDP | Power Delay Profile |
| PRS | Positioning Reference Signal |
| RAT | Radio Access Technology |
| RF | Radio Frequency |
| RRC | Radio Resource Control |
| Rx | Receiver |
| SET | SUPL Enabled Terminal |
| SLP | SUPL Location Platform |
| SUPL | Secure User Plane Location |
| TRP | Transmission and Reception Point |
| Tx | Transmitter |
| UE | User Equipment |
| UL | Uplink |
| V2X | Vehicle to Everything |
| VRU | Vulnerable Road User |

What is claimed is:

1. A method for determining a location of an object, the method comprising:

obtaining information comprising (a) a first angle-of-arrival parameter and/or first angle-of-departure parameter corresponding to a non-primary propagation path of a radio signal transmitted between a first wireless device and a second wireless device, and further comprising:

(b) a delay measurement or time-of-arrival measurement for the non-primary propagation path; and/or (c) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimating a location for an object other than the first and second wireless devices, based on the obtained information;

wherein:

the method is performed by a first one of the first and second wireless devices;

obtaining the first angle-of-arrival parameter or first angle-of-departure parameter comprises receiving the first angle-of-arrival parameter or first angle-of-departure parameter from the other of the first and second wireless devices; and obtaining the delay measurement or the time-of-arrival measurement or the second angle-of-arrival parameter or the second angle-of-departure parameter comprises measuring the delay measurement or the time-of-arrival measurement or the second angle-of-arrival parameter or the second angle-of-departure parameter based on at least one signal transmitted between the first and second wireless devices.

2. The method of claim 1, wherein estimating the location of the object is performed based further on location information for the first and/or second wireless devices, and wherein the method further comprises receiving, from the second one of the first and second wireless devices, location information for the second one of the first and second wireless devices.

3. The method of claim 1, wherein the method comprises reporting the estimated location for the object to the other one of the first and second wireless devices.

4. A wireless device, comprising:

transceiver circuitry; and processing circuitry operatively associated with the transceiver circuitry and configured to:

obtain information comprising (a) a first angle-of-arrival parameter and/or first angle-of-departure parameter corresponding to a non-primary propagation path of a radio signal transmitted between a first wireless device and a second wireless device, and further comprising:

(b) a delay measurement or time-of-arrival measurement for the non-primary propagation path; and/or (c) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimate a location for an object other than the first and second wireless devices, based on the obtained information;

wherein the wireless device is a first one of the first and second wireless devices, and the processing circuitry is configured to:

obtain the first angle-of-arrival parameter or first angle-of-departure parameter by receiving the first angle-of-arrival parameter or first angle-of-departure parameter from the other of the first and second wireless devices; and obtain the delay measurement or the time-of-arrival measurement or the second angle-of-arrival parameter or the second angle-of-departure parameter by measuring the delay measurement or the time-of-arrival measurement or the second angle-of-arrival parameter or the second angle-of-departure parameter based on at least one signal transmitted between the first and second wireless devices.

5. The wireless device of claim 4, wherein the processing circuitry is configured to estimate the location of the object based further on location information for the first and/or second wireless devices, and wherein the processing circuitry is configured to receive, from the second one of the-first and second wireless devices, location information for the second one of the first and second wireless devices.

6. The wireless device of claim 4, wherein the processing circuitry is configured to report the estimated location for the object to the other one of the first and second wireless devices.

7. The wireless device of claim 4, wherein the processing circuitry is further configured to compare the estimated location to a digital map of scatterers to determine whether the estimated location corresponds to an already identified scatterer or corresponds to a potentially new scatterer.

8. A network node, comprising:

communications interface circuitry configured to communicate with one or more other network nodes; and processing circuitry operatively associated with the communications interface circuitry and configured to:

obtain information comprising (a) a first angle-of-arrival parameter and/or first angle-of-departure parameter corresponding to a non-primary propagation path of a radio signal transmitted between a first wireless device and a second wireless device; and further comprising:

(b) a delay measurement or time-of-arrival measurement for the non-primary propagation path; and/or (c) a second angle-of-arrival parameter and/or second angle-of-departure parameter corresponding to the non-primary propagation path, the second angle-of-arrival parameter and second angle-of-departure parameter corresponding to a different end of the non-primary propagation path to the first angle-of-arrival parameter and angle-of-departure parameter; and estimate a location for an object other than the first and second wireless devices, based on the obtained information;

wherein the processing circuitry is configured to:

obtain the first angle-of-arrival parameter or first angle-of-departure parameter by receiving the first angle-of-arrival parameter or first angle-of-departure parameter from a first one of the first and second wireless devices; and obtain the delay measurement or the time-of-arrival measurement or the second angle-of-arrival parameter or the second angle-of-departure parameter by receiving the delay measurement or the time-of-arrival measurement or the second angle-of-arrival parameter or the second angle-of-departure parameter from the other of the first and second wireless devices.

9. The network node of claim 8, wherein the processing circuitry is configured to estimate the location of the object based further on location information for the first and/or second wireless devices.

10. The network node of claim 9, wherein the processing circuitry is configured to receive, from the first and second wireless devices, location information for the first and second wireless devices.

11. The network node of claim 8, wherein the network node is configured to report the estimated location for the object to the first and second wireless devices.

12. The network node of claim 8, wherein the processing circuitry is further configured to compare the estimated location to a digital map of scatterers to determine whether the estimated location corresponds to an already identified scatterer or corresponds to a potentially new scatterer.

* * * * *